(12) United States Patent
Huang et al.

(10) Patent No.: US 8,405,588 B2
(45) Date of Patent: Mar. 26, 2013

(54) DATA ACCESSING SYSTEM AND DATA ACCESSING METHOD

(75) Inventors: Yung-Ho Huang, Yunlin County (TW); Yang-Chen Hsu, Hsin-Chu (TW)

(73) Assignee: ILI Technology Corp., Taiyuan St., Jhubei, Hsinchu County (TW)

( * ) Notice: Subject to any disclaimer, the term of this patent is extended or adjusted under 35 U.S.C. 154(b) by 1108 days.

(21) Appl. No.: 12/353,265

(22) Filed: Jan. 14, 2009

(65) Prior Publication Data

US 2009/0179907 A1 Jul. 16, 2009

(30) Foreign Application Priority Data

Jan. 14, 2008 (TW) ................................ 97101319 A

(51) Int. Cl.
*G09G 3/36* (2006.01)
(52) U.S. Cl. ........................... 345/87; 345/204; 345/534
(58) Field of Classification Search .................. 345/55, 345/76–77, 84, 87–100, 204–206, 214, 690
See application file for complete search history.

(56) References Cited

U.S. PATENT DOCUMENTS

| 6,144,356 | A | * | 11/2000 | Weatherford et al. | ......... | 345/100 |
| 6,333,729 | B1 | * | 12/2001 | Ha | ................................ | 345/98 |
| 7,180,497 | B2 | | 2/2007 | Lee | | |
| 7,239,567 | B2 | * | 7/2007 | Kwon | ........................... | 365/203 |
| 7,782,287 | B2 | * | 8/2010 | Hsiao | ............................ | 345/98 |
| 2005/0270257 | A1 | | 12/2005 | Shin | | |
| 2007/0262945 | A1 | | 11/2007 | Chae | | |

FOREIGN PATENT DOCUMENTS

| TW | 540020 | 7/2003 |
| TW | 200632850 | 9/2006 |
| TW | 200746011 | 12/2007 |

\* cited by examiner

*Primary Examiner* — William L Boddie
*Assistant Examiner* — Mansour M Said
(74) *Attorney, Agent, or Firm* — Winston Hsu; Scott Margo

(57) ABSTRACT

The present invention provides a data accessing system and a data accessing method. The method comprises: separately storing a (N×M)-bit digital data in L banks of a data storage module; utilizing a register module of a data accessing interface module to transmit data of a bank for L times in sequence, and to receive and latch the digital data included by a bank from the data storage module when transmitting data each time, until the (N×M)-bit digital data is totally latched in the register module; and utilizing a multiplex output module of the data accessing interface module to continuously select a M-bit digital data from the (N×M)-bit digital data registered in the register module, and input the M-bit digital data to a data retrieving device via M data transmission lines.

7 Claims, 4 Drawing Sheets

20 US 8,405,588 B2

DATA ACCESSING SYSTEM AND DATA ACCESSING METHOD

BACKGROUND OF THE INVENTION

1. Field of the Invention

The present invention relates to a data accessing system and a data accessing method, and more specifically, to a data accessing system and a data accessing method applied to an LCD display IC for saving routing space area and power consumption.

2. Description of the Prior Art

LCD monitors and related display apparatuses are small and light-weighted display devices, which can be found in many electronic products and are commonly applied to many fields nowadays. For example, in addition to aviation industry and medical equipment industry, they are utilized in portable communication devices, laptop computers, and digital cameras. The LCD monitors can offer flat, detailed, and high-resolution displays with high color contrast and high screen refresh rate. As to most of electronic products using the LCD monitors and having limited power provided by the battery devices, such as portable communication devices, how to provide LCD monitors with high power efficiency, low production cost, and smaller size to meet user's requirements has become a key issue of the future display apparatus development.

Please refer to FIG. 1. FIG. 1 is a block diagram of a data accessing system 100 in accordance with a LCD display IC of the prior art. The data accessing system 100 comprises a data storage device 110 and a source device 120. The data storage device 110 comprises a memory 112 and a register module 114, and the source device 120 has a source driver 122 and a register module 124, wherein the register module 114 contains a plurality of latches 114_1-114_$n$ and the register module 124 contains a plurality of latches 124_1-124_$n$. The memory 112 in the data accessing system 100 is used for storing digital data corresponding to color components R, G, B of each pixel. For instance, digital data associated with one color component R, G, or B of a pixel contain 6-bit. In other words, suppose that each row of the memory 112 stores digital data of 176 pixels. Because each pixel comprises data of three color components R, G, and B, the bit number of digital data representative of each pixel is 18 (i.e., 6*3). Therefore, the bit number of each row in the memory 112 is 3168 (i.e., 176*18). In addition, the source driver 122 in the source device 120 refers to the pixel data provided by the memory 112 to drive the display panel (not shown) of the LCD monitor to show images corresponding to the pixel data. Please note that operations of the above memory 112 and the source driver 122 are well known to those skilled in this art, and further description is omitted here for the sake of brevity.

In the prior art data accessing system 100, each row of data in the memory 112 is accessed and latched in respective latches 114_1-114_$n$ of the register module 114 through transmission lines a1-an. As mentioned above, if each of the latches 114_1-114_$n$ is able to latch one bit, the register module 114 needs 3168 (i.e., n=176*8) latches to latch a complete row of pixel data. Next, each latch in the register module 114 transmits digital data buffered therein to a corresponding latch in the register module 124 of the source device 120 through a transmission line. It should be noted that because the register module 114 in the present example contains 3168 latches, the prior art data accessing system 100 requires 3168 transmission lines (shown by L1-Ln in FIG. 1) coupled between the register modules 114 and 124. This results in a large routing space needed by the data accessing system 100. Similarly, the register module 124 in the source device 120 also contains latches 124_1-124_$n$ of the same number as that of the corresponding latches 114_1-114_$n$. When the latches 124_1-124_$n$ have received a complete row of digital data transmitted from the register module 114, the register module 124 transmits the received row of digital data to the source driver 122. The source driver 122 then activates the following image processing according to the received row of digital data, thereby achieving the objective of driving pixels at each scan line of the back-end display panel.

As mentioned above, the prior art LCD display IC requires 3168 transmission lines coupled between the data storage device 110 and the source device 120 to transmit data. In this way, not only is the circuit layout area needed by the LCD display IC increased, but also the cost of routing traces is increased. Furthermore, when data are transmitted via too many transmission lines, the total load of the transmission lines is increased, raising the overall power consumption and degrading the performance of the LCD display IC.

Please refer to FIG. 2. FIG. 2 is a block diagram of a data accessing system 200 in accordance with another LCD display IC of the prior art. The data accessing system 200 comprises a memory 212, a memory bus 223 capable of delivering data-bit of one pixel per bus cycle, and a source device 220. The source device 220 comprises a source driver 222, a register module 224, and a latch control shift unit 226, wherein the register module 224 comprises a plurality of latches 224_1-224_$n$ similar to the latches 124_1-124_$n$ shown in FIG. 1, and the latch control shift unit 226 comprises a plurality of shift registers 226_1-226_$n$ used for inputting pixel data outputted from the memory 212 into the register module 224. This prior art scheme is able to eliminate direct traces routed from the memory 212 to the source. However, if there are 176 pixels located at each row, the memory 212 has to be accessed 176 times. That is, the memory array is enabled 176 times, increasing the power consumption greatly.

SUMMARY OF THE INVENTION

It is therefore one of the objectives of the present invention to provide a data accessing system and a data accessing method that can be applied to an LCD display IC for reducing layout space area and power consumption, so as to solve the problem mentioned above.

In accordance with an embodiment of the present invention, a data accessing system is disclosed. The data accessing system comprises: a data retrieving device; M data transmission lines, coupled to the data retrieving device; and a data storage device, coupled to the M data transmission lines. The data storing device comprises: a data storing module, having L banks, the data storing module being utilized for storing a (N×M)-bit digital data separately in the L banks; and a data accessing interface module, coupled to the data storage module, for reading and outputting the (N×M)-bit digital data. The data accessing interface module comprises: a register module, for transmitting data of a bank for L times in sequence, and receiving and latching the digital data included by a bank from the data storage module when transmitting data each time, until the (N×M)-bit digital data is totally latched in the register module; and a multiplex output module, coupled to the register module, for continuously select a M-bit digital data from the (N×M)-bit digital data registered in the register module, and input the M-bit digital data to a data retrieving device via M data transmission lines.

In accordance with an embodiment of the present invention, a data accessing method is further disclosed. The data accessing method comprises: (a) separately storing a (N×M)-bit digital data in L banks of a data storage module; (b) utilizing a register module of a data accessing interface module to transmit data of a bank for L times in sequence, and to receive and latch the digital data included by a bank from the data storage module when transmitting data each time, until the (N×M)-bit digital data is totally latched in the register module; and (c) utilizing a multiplex output module of the data accessing interface module to continuously select a M-bit digital data from the (N×M)-bit digital data registered in the register module, and input the M-bit digital data to a data retrieving device via M data transmission lines.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
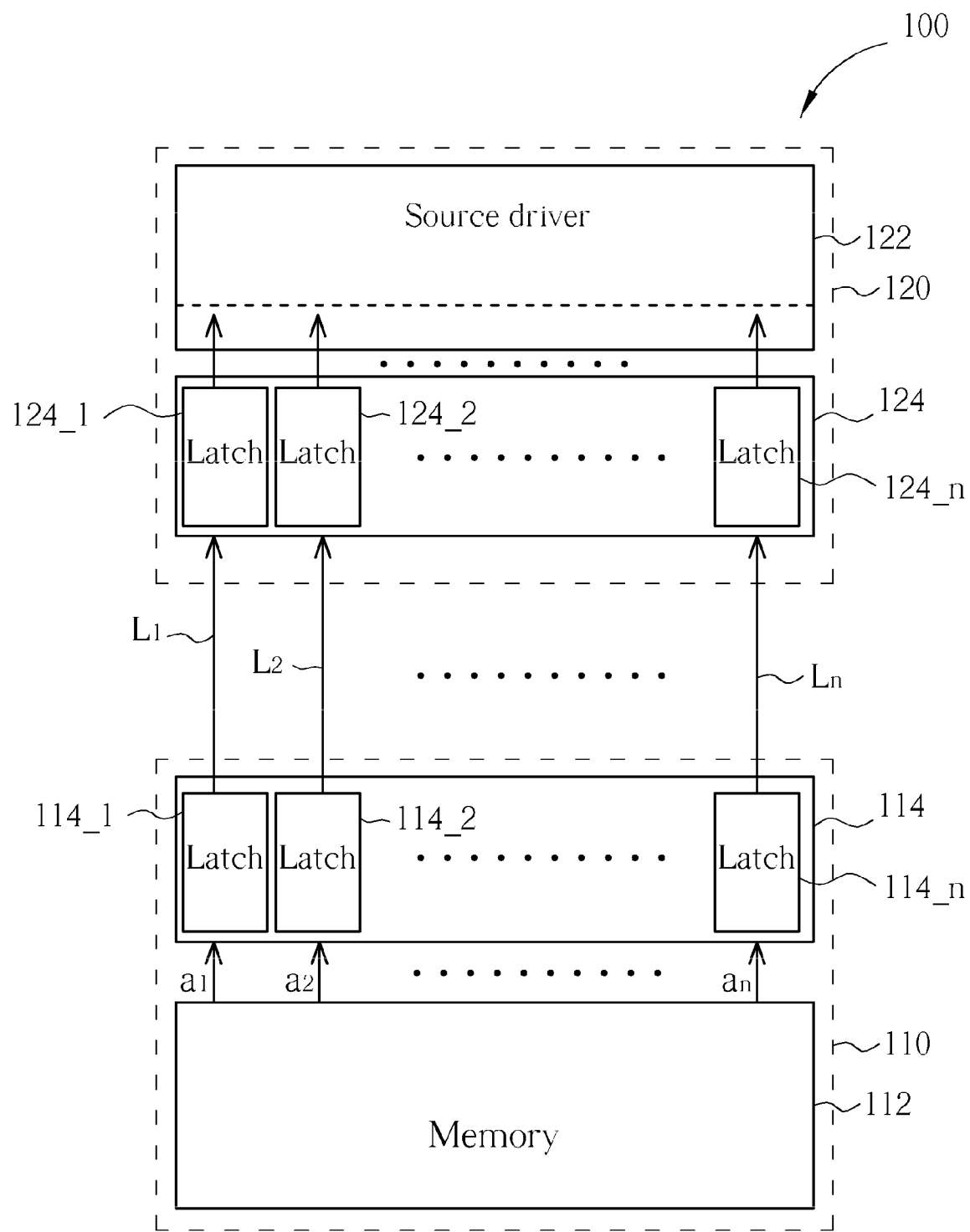
FIG. 1 is a block diagram of a data accessing system in accordance with a LCD display IC of the prior art.
Figure 3:
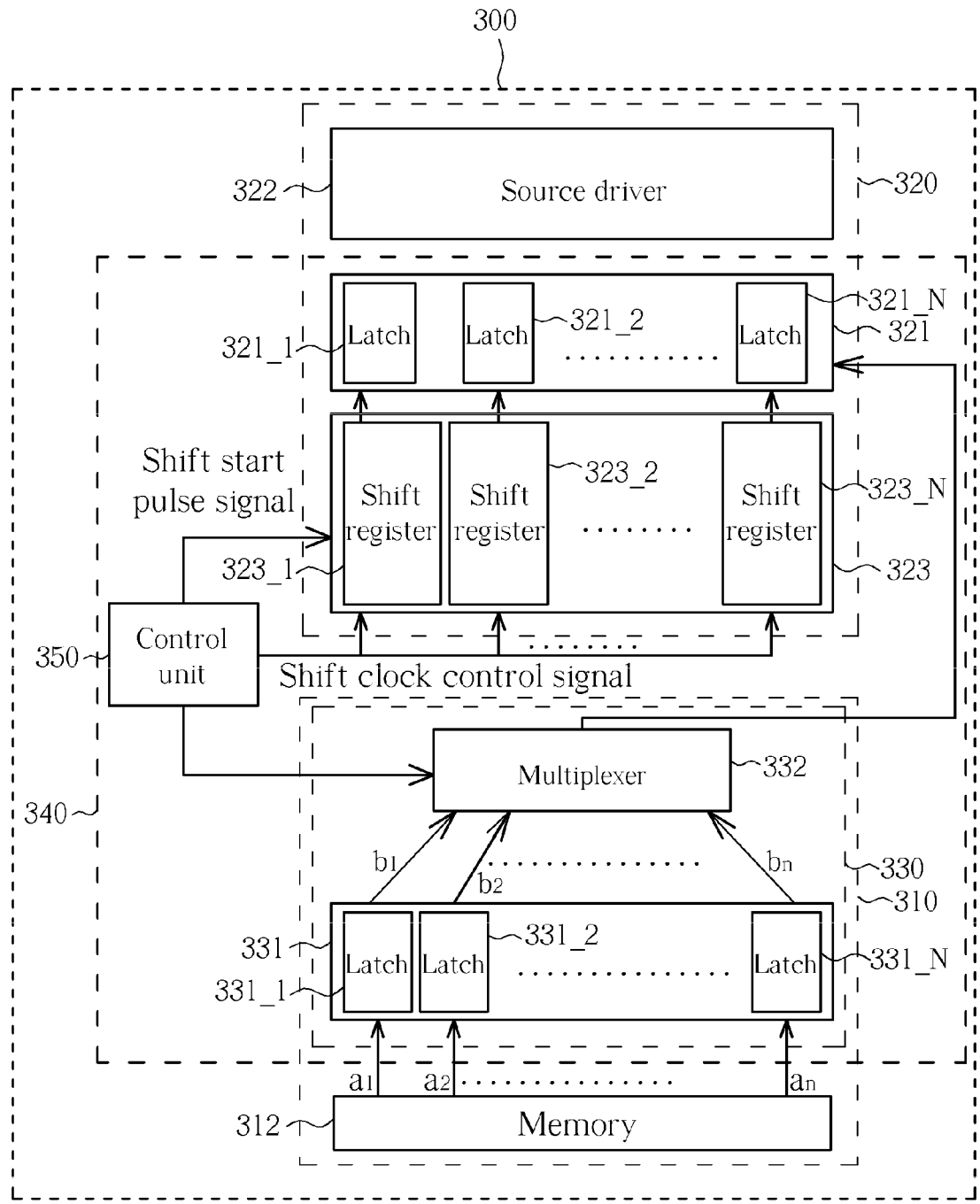
FIG. 3 is a data accessing system according to an embodiment of the present invention.

Please refer to FIG. 3. FIG. 3 is a data accessing system 300 according to an embodiment of the present invention. In this embodiment, the data accessing system 300 comprises a data storage device 310, a source device 320 (i.e., a data retrieving device), and a control unit 350. The data storage device 310 comprises a memory 312 (e.g., a static random access memory (SRAM) or dynamic random access memory (DRAM)) and a data accessing interface module 330, and the source device 320 comprises a source driver 322, a first sequential input module 323, and a second sequential input module 321, wherein the data accessing interface module 330 comprises a register module 331 and a multiplex output module 332, and the first sequential input module 323 comprises a plurality of shift register 323_1-323_N, and the second sequential input module 321 comprises a plurality of latches 321_1-321_N and N/M latch control signals. In addition, the register module 331 comprises a plurality of latches 331_1-331_N, and the multiplex output module 332 comprises a plurality of multiplexers (MUX) 332_1-332_M. Please note that since the components of the same name in the devices shown in FIG. 3 and FIG. 1 have the same functionality and operation, further description is omitted here for the sake of brevity.

The data accessing interface 340 consists of the data accessing interface module 330, the first sequential input module 323, the second sequential input module 321, and the control unit 350. In this embodiment, suppose that each row of the memory 312 stores digital data (i.e., pixel data) corresponding to 176 pixels, and digital data of each pixel contain 18 (i.e., 6*3) bits where the gray level of each color component R, G, B is represented by 6 bits. The bit number of each row in the memory 312 is 3168 (i.e., 176*18), and each row is separated to 22 banks, and thus each bank has digital data of 8 pixels (i.e., 144 bits). In other words, a complete row of pixel data in the memory 312 is accessed and latched by respective latches 331_1-331_N of the register module 331 via 22 banks and through transmission lines $a_1$-$a_n$, where N=176 in this embodiment of the present invention. Next, after the data are fully gathered, the latches 331_1-331_N of the register module 331 transfer data buffered therein to the multiplex output module 332 through transmission lines $b_1$-$b_n$, where N=176 in this embodiment of the present invention.

Please note that the multiplex output module 332 in this embodiment of the present invention is a (176×18)-to-18 multiplexer, and the multiplex output module 332 is utilized for continuously selecting a 18-bit digital data from the (176×18)-bit digital data, and input the M-bit digital data to the source device 320 via 18 data transmission lines.

The control unit 350 is coupled to the multiplex output module 332 and the first sequential input module 323, and utilized for outputting a selecting control signal to the multiplex output module 323 to control the multiplex output module 323 to periodically select a 18-bit digital data from the (176×18)-bit digital data, and outputting a plurality of clock control signals to the first sequential input module 323 to control the first sequential input module 323 to generate a plurality of latch control signals to constantly latch the 18-bit digital data to the second sequential input module 321. Thus, if the conventional data accessing system needs 176×18 transmission lines to transmit the digital data bits of a row of 176 pixels, then the data accessing system 300 of the present invention only needs 18 transmission lines to achieve the same objective of transmitting the digital data bits of a row of 176 pixels. In this way, the transmission line layout area required by the data accessing system can be greatly reduced.

Figure 4:
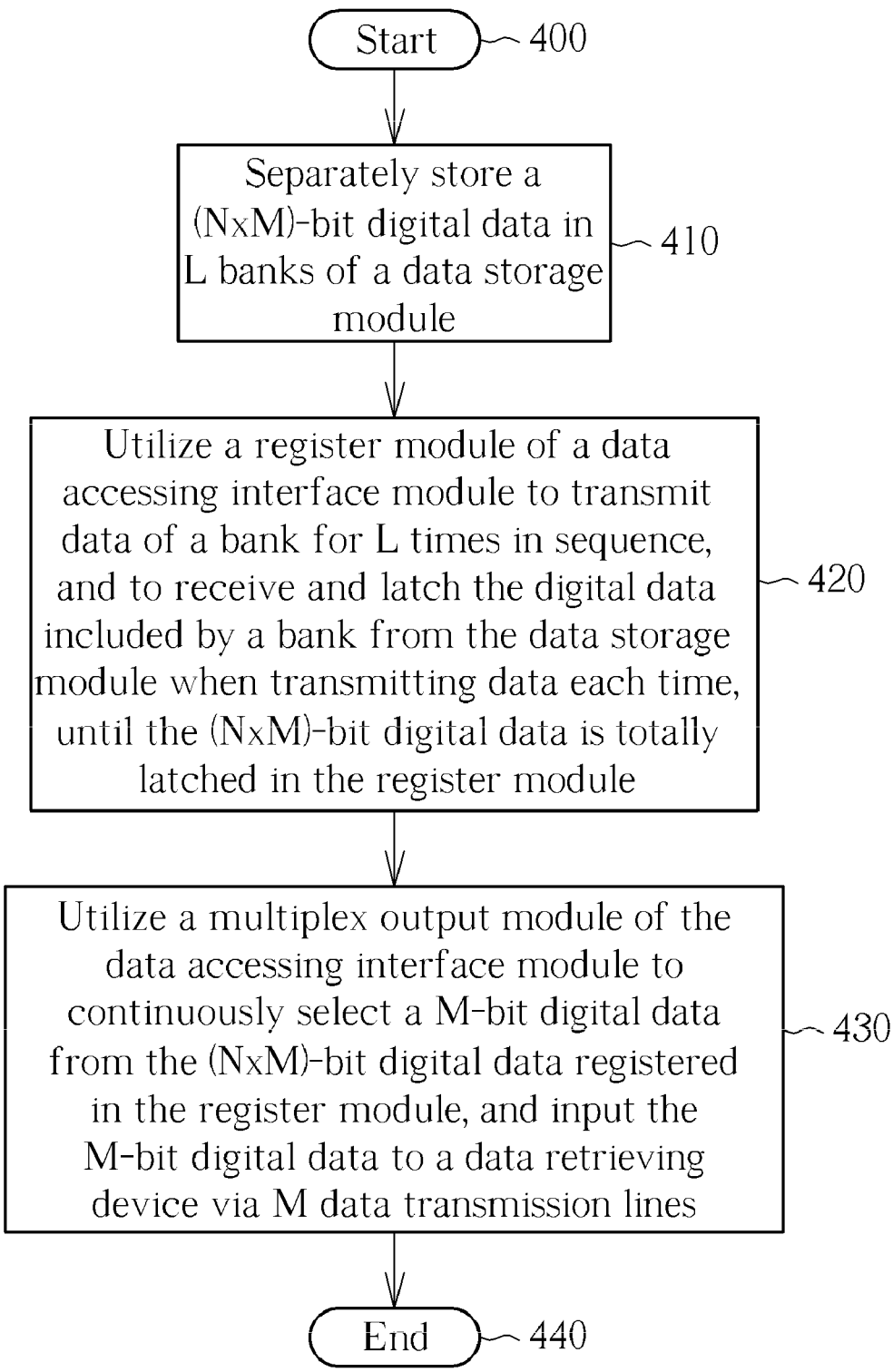
FIG. 4 is a flowchart illustrating a data accessing method of using the data accessing system to deliver data bits through the data accessing interface according to an embodiment of the present invention.

Please refer to FIG. 4. FIG. 4 is a flowchart illustrating a data accessing method of using the data accessing system 300 to deliver data bits through the data accessing interface 340 according to an embodiment of the present invention. Suppose that the result is substantially the same. The steps shown in the flowchart are not limited to be executed in the exact order. Additionally, other steps can be inserted. The data accessing method comprises following steps:

Step 400: Start.

Step 410: Separately store a (N×M)-bit digital data in L banks of a data storage module.

Step 420: Utilize a register module of a data accessing interface module to transmit data of a bank for L times in sequence, and to receive and latch the digital data included by a bank from the data storage module when transmitting data each time, until the (N×M)-bit digital data is totally latched in the register module.

Step 430: Utilize a multiplex output module of the data accessing interface module to continuously select a M-bit digital data from the (N×M)-bit digital data registered in the register module, and input the M-bit digital data to a data retrieving device via M data transmission lines.

Step 440: End.

Please note that the Step 430 in the above embodiment can further comprises: installing a first sequential input module in the data retrieving device to sequentially receive and latch the M-bit digital data from the multiplex output module; and installing a second sequential input module in the data retrieving device to sequentially receive and latch the M-bit digital data from the first sequential input module. In addition, the data accessing method of the present invention can further comprises: providing a control unit for outputting a selecting control signal to the multiplex output module to control the multiplex output module to periodically select a M-bit digital data from the (N×M)-bit digital data, and outputting a plurality of clock control signals to the first sequential input module to control the first sequential input module to generate a plurality of latch control signals to constantly latch the M-bit digital data to the second sequential input module.

It should be noted that in the above embodiment the multiplex output module 332 is implemented using a (N×M)-to-M multiplexer having (N×M) input nodes and M output nodes; however, in other embodiments, multiplexers of different types can be adopted. In general, the implemented multiplexers each having more output nodes are capable of saving more transmission line routing space. However, the processing time required to complete transmitting all of the pixel data becomes longer accordingly. Therefore, the present invention can select proper multiplexers according to desired design requirements. Furthermore, the above embodiment uses a transmission line to connect the output node of a multiplexer to input nodes of N latches in the second sequential input module, and uses latch control signals generated by N shift registers to store all the inputted data bits. Not only the transmission line routing space is reduced, but also the inputted data bits can be correctly latched. In other embodiments, it is possible to use latches of a different number to work with the multiplexer. These alternative designs all fall in the scope of the present invention.

Figure 2:
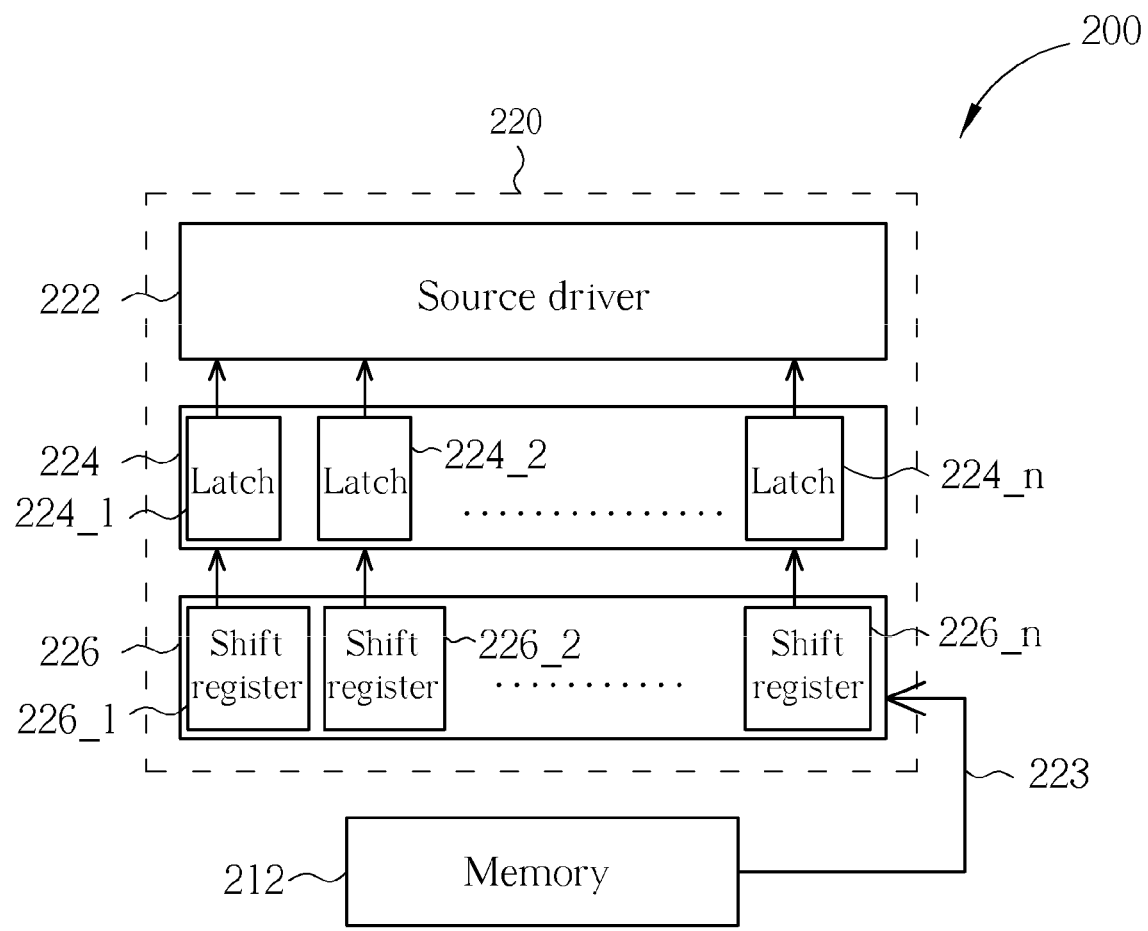
FIG. 2 is a block diagram of a data accessing system in accordance with another LCD display IC of the prior art.

According to above description, it can be readily understood that the multiplex output module 330 utilizes a single-level register module 331 and a multiplex output module 332 to greatly reduce the number of transmission lines originally required for transmitting data bits from the memory 312 to the source driver 322. Comparing transmission line numbers of the present invention and the prior art, the prior art data accessing system 100 shown in FIG. 1 needs 3168 transmission lines to deliver data bits, while the data accessing system 300 of the present invention merely needs 176 transmission lines to deliver data bits. The data accessing system of the present invention therefore is capable of saving the routing space of an LCD display IC and the production cost thereof. Additionally, the magnitude of peak current is lowered due to fewer implemented transmission lines. In this way, the overall power consumption is reduced, thereby improving the performance of the LCD display IC. Compared with the prior art data accessing system 200 shown in FIG. 2 that requires accessing the memory 176 times, the data accessing system 300 of the present invention only accesses the memory 22 times (since 176 pixels are averagely stored in 22 banks). Please note that there is no need to access the memory when using the multiplex output module to transmit data bits. Therefore, the power consumption is greatly reduced. When the data accessing system 300 of the present invention has to operate under a low supply voltage if fabricated using an advanced semiconductor process, it is practical to adjust a pixel number of each bank to increase or decrease the number of times of accessing the memory, and the power consumption and the accessing time can be adjusted properly.

Those skilled in the art will readily observe that numerous modifications and alterations of the device and method may be made while retaining the teachings of the invention.

What is claimed is:

1. A data accessing system, comprising:
   a data retrieving device;
   M data transmission lines, coupled to the data retrieving device; and
   a data storage device, coupled to the M data transmission lines, the data storing device comprising:
      a data storing module, having L banks, the data storing module being utilized for storing a (N×M)-bit digital data separately in the L banks; and
      a data accessing interface module, coupled to the data storage module, for reading and outputting the (N×M)-bit digital data, the data accessing interface module comprising:
         a register module, for transmitting data of a bank for L times in sequence, and receiving and latching the digital data included by a bank from the data storage module when transmitting data each time, until the (N×M)-bit digital data is totally latched in the register module; and
         a multiplex output module, coupled to the register module, for continuously select a M-bit digital data from the (N×M)-bit digital data registered in the register module, and input the M-bit digital data to a data retrieving device via M data transmission lines;
   wherein the data retrieving device comprises:
      a first sequential input module, for sequentially receiving the M-bit digital data; and
      a second sequential input module, coupled to the first sequential input module, for sequentially receiving and latching the M-bit digital data from the multiplex output module; and
   the data accessing system further comprises:
      a control unit, coupled to the multiplex output module and the first sequential input module, for outputting a selecting control signal to the multiplex output module to control the multiplex output module to periodically select a M-bit digital data from the (N×M)-bit digital data, and outputting a plurality of clock control signals to the first sequential input module to control the first sequential input module to generate a plurality of latch control signals to the second sequential input module to constantly latch the M-bit digital data.

2. The data accessing system of claim 1, wherein the (N×M)-bit digital data are averagely stored in each of the banks, and the register module receives and latches a (N×M/L)-bit digital data from each bank of the data storage module when transmitting data each time.

3. The data accessing system of claim 1, wherein the register module comprises N first latch units, the first sequential input module comprises N shift register units, and the second sequential input module comprises N second latch units.

4. The data accessing system of claim 1, wherein the data storing module is a static random access memory (SRAM) or dynamic random access memory (DRAM).

5. The data accessing system of claim 1, wherein the data retrieving device is a source driver applied to a LCD panel.

6. A data accessing method, comprising:
   (a) separately storing a (N×M)-bit digital data in L banks of a data storage module;

(b) utilizing a register module of a data accessing interface module to transmit data of a bank for L times in sequence, and to receive and latch the digital data included by a bank from the data storage module when transmitting data each time, until the (N×M)-bit digital data is totally latched in the register module;

(c) utilizing a multiplex output module of the data accessing interface module to continuously select a M-bit digital data from the (N×M)-bit digital data registered in the register module, and input the M-bit digital data to a data retrieving device via M data transmission lines, wherein the data retrieving device comprises: a first sequential input module, for sequentially receiving the M-bit digital data; and a second sequential input module, coupled to the first sequential input module, for sequentially receiving and latching the M-bit digital data from the multiplex output module; and (d) providing a control unit coupled to the multiplex output module and the first sequential input module, for outputting a selecting control signal to the multiplex output module to control the multiplex output module to periodically select a M-bit digital data from the (N×M)-bit digital data, and outputting a plurality of clock control signals to the first sequential input module to control the first sequential input module to generate a plurality of latch control signals to the second sequential input module to constantly latch the M-bit digital data.

7. The data accessing method of claim 6, wherein the (N×M)-bit digital data are averagely stored in each of the banks, and the register module receives and latches a (N×M/L)-bit digital data from each bank of the data storage module when transmitting data each time.

* * * * *